Oct. 14, 1969　　B. L. OLIVER　　3,473,115
METHOD AND APPARATUS FOR TESTING MAGNETOSTRICTIVE DELAY
LINES BY CHECKING FOR SIGNAL COINCIDENCE BETWEEN
SIGNAL PULSES AND REFERENCE PULSES IN DIFFERENT
PHASE POSITIONS OF THE REFERENCE PULSES
Filed Dec. 30, 1966　　　　　　　　　　　　　2 Sheets-Sheet 1

INVENTOR
BURTON L. OLIVER

BY John C Black
ATTORNEY

United States Patent Office 3,473,115
Patented Oct. 14, 1969

3,473,115
METHOD AND APPARATUS FOR TESTING MAGNETOSTRICTIVE DELAY LINES BY CHECKING FOR SIGNAL COINCIDENCE BETWEEN SIGNAL PULSES AND REFERENCE PULSES IN DIFFERENT PHASE POSITIONS OF THE REFERENCE PULSES
Burton L. Oliver, Milo, Maine, assignor to International Business Machines Corporation, Armonk, N.Y., a corporation of New York
Filed Dec. 30, 1966, Ser. No. 606,363
Int. Cl. G01r 11/00; H03k 5/20
U.S. Cl. 324—68                    10 Claims

ABSTRACT OF THE DISCLOSURE

Maximum jitter in a magnetostrictive delay line is produced by repetitively applying selected pulse patterns to the line. The resultant output pulses are compared in a coincidence circuit with cyclical pulses of short duration. The phase of the cyclical pulses is varied to determine the maximum phase variation (jitter) in the delay line output pulses.

---

This invention relates generally to an improved method and means for determining whether or not the amount of jitter received in electrical pulses exceeds predetermined test specifications, and more particularly to an improved method and apparatus for testing for jitter in magnetostrictive delay lines and the like.

In one form, the maximum jitter in a magnetostrictive delay line is produced by applying selected pulse patterns to the line. The resultant output pulses are compared in a coincidence circuit with cyclical pulses of short duration. The phase of the cyclical pulses is varied to determine the maximum phase variation (jitter) in the delay line output pulses.

In a United States patent application, Ser. No. 605,754, filed on Dec. 29, 1966, by B. L. Oliver, the inventor herein, and others, identified as Docket EN966019 and assigned to the same assignee as the present application, there is described an improved method and means for checking magnetostrictive delay lines and the like for excessive jitter conditions. Said copending application is hereby incorporated herein by reference as if it were set forth in its entirety. Certain of the circuits herein which will be described briefly, are shown in greater detail in said copending application.

In data transmission apparatus, magnetostrictive delay lines and the like, data pulses having a predetermined phase and pulse width are applied to the input to the system. It would be desirable if these pulses were received at the output of the system undistorted with respect to both phase and pulse width. However, it is well known that both the phase and the width of the pulses become distorted during the transmission from the input to the output. It is further recognized that the distortion which is introduced at the output is determined in part by the pattern of the pulses generated. Different pulse sequences will have a greater or less effect upon the distortion introduced at the output. This distortion is frequently referred to as "jitter."

When magnetostrictive delay lines are used as storage devices, the data received at the output of the line is frequently recirculated in storage by re-applying the data to the input. When the delay line is used in this manner, the output data pulses must be restored to the same pulse width and their phase must be re-timed so that they occur with the same time relation to each other at the input. Only then can they be recirculated. For the pulses to be re-timed, each pulse must occur during a specified clock period; furthermore, it must be guaranteed that, with maximum jitter, the output pulse will still occur during its particular clock cycle. If jitter were the only condition that caused variations in the timing, the whole period of a clock cycle could be used to re-time the output pulse. However, other conditions which need not be described here, enter into the problem so that only a part of each clock cycle can be allotted to jitter variation. For this reason, a delay line must have less than a specified maximum level of jitter.

This jitter problem becomes extremely critical in the operation of magnetostrictive delay lines, particularly at very high frequencies in the order of one megacycle. The problem is so severe that where high quality operation of the apparatus is required, each and every delay line must be very carefully inspected to determine whether or not the worst case jitter for any and all patterns exceeds specifications.

So far as is known, the method commonly utilized was a manual-operator technique which involved the use of a data pulse pattern generator connected to the input of a delay line and an oscilloscope connected to the output of the delay line to receive the output pulses derived from the pattern. The output pulses were superimposed upon each other on the oscilloscope screen, and the operator visually determined whether or not the maximum jitter introduced in the output exceeded predetermined specifications. This method, however, is extremely inaccurate and suffers greatly from problems related to operator fatigue, operator error and difficulty in visually observing the extremities of the pulses applied to the oscilloscope screen because of various light intensities for different pulses and because of the fading of the pulses with time.

With the advent of stricter requirements for magnetostrictive delay lines to be used as data storage devices in electronic data processing apparatus, the previous manual techniques described above become completely inadequate. The requirements for accuracy of operation are too great for reliance upon such an inaccurate method. In addition, the time required for inspecting each and every delay line was excessive in the previous method.

It is therefore a primary object of the present invention to provide an improved method and means for testing for maximum jitter conditions in the output of a magnetostrictive line or the like.

This object is achieved in one preferred embodiment of the present invention by providing means including a clock and a pattern generator which apply a selected serial pattern of pulses to the magnetostrictive delay line under test for producing a maximum jitter condition at the output of the delay line.

Clock pulses at a frequency preferably corresponding to the frequency at which the magnetostrictive delay line is to be operated are selectively applied by the generator in a widely varying serial pattern to the magnetostrictive delay line. Standardized pulses of very short time duration are produced in response to output pulses from the delay line and are applied to one input of a logical AND circuit. Means responding to the clock pulses also produce standardized pulses of short time duration. The phase of these latter standardized signals is varied, and the signals are then applied to another input of the AND circuit. The phase positions in which the latter standardized pulses overlay or coincide with the former standardized pulses is a measure of the amount of jitter in the magnetostrictive delay line.

More specifically, the phase variable pulses are produced by applying the clock pulses to a variable delay line. In each selected setting of the variable delay line, an entire pattern of pulses is applied to the magnetostrictive delay line. The amount of delay (phase displacement) which is introduced from input to output in the variable delay line is selectively increased until at least one of the output pulses from the variable delay line coincides in time with at least one of the standardized output pulses from the magnetostrictive delay line under test. Satisfaction of the logical AND circuit input requirement determines this overlapping or coincidence condition. The amount of delay in the variable delay line is further increased until such time as the coincidence condition between the output signals from the variable delay line and the magnetostrictive delay line no longer exists. The variation in the variable delay line adjustment from the satisfaction and subsequent non-satisfaction of the logical AND condition is a measure of the amount of jitter introduced into the output pulses of the magnetostrictive delay line plus a correction factor, i.e. the standardized output pulse width of the magnetostrictive delay line plus the standardized pulse width of the output pulses of the variable delay line.

The same procedure is followed to measure the correction factor, with one exception; i.e. only widely spaced single pulses are applied to the magnetostrictive delay line so that substantially no jitter is introduced into the output of the magnetostrictive delay line. The time interval between the satisfaction and non-satisfaction of the coincidence condition is the correction factor representing the sum of the pulse width of the standardized output signal of the magnetostrictive delay line without jitter and the pulse width of the output of the variable delay line. Subtraction of (1) the correction factor from (2) the measured jitter plus correction factor is performed to determine the maximum jitter present.

The foregoing and other objects, features and advantages of the invention will be apparent from the following more particular description of preferred embodiments of the invention, as illustrated in the accompanying drawings.

Figure 1:
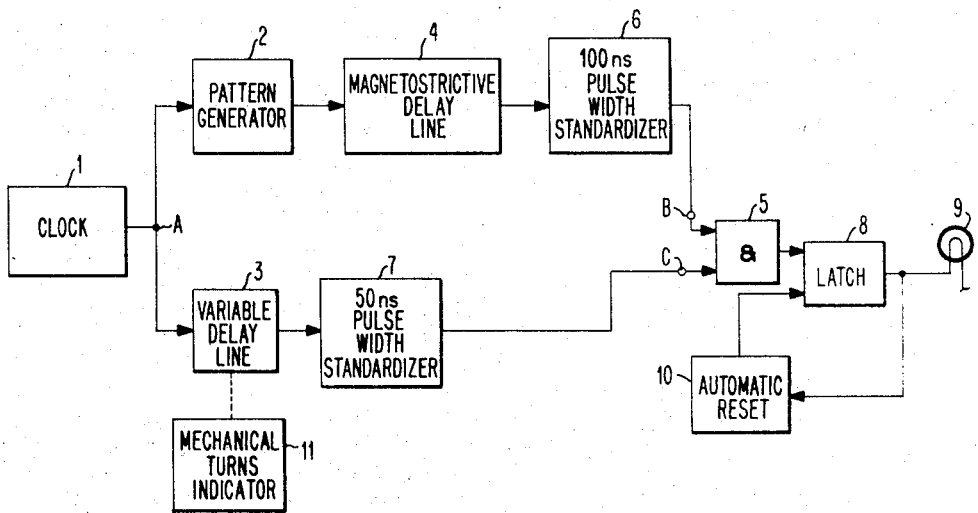
FIG. 1 is a diagrammatic illustration of apparatus embodying the improvements of the present invention, whereby jitter can be tested semi-automatically.

The apparatus of FIG. 1 includes a clock 1, the output of which is connected to a pattern generator 2 and a variable delay line 3. The output A of the pattern generator is connected to the input of the magnetostrictive delay line 4 under test, and the output of the delay line is connected to one input B of a logical AND circuit 5 by way of a pulse width standardizer 6. The output of the variable delay line 3 is connected to a second input C of the AND circuit 5 by way of a second pulse width standardizer 7.

The output of the AND circuit 5 is connected to the SET input of a latch circuit 8 and the output of the latch is connected to an indicator lamp 9 and to a circuit 10 which automatically resets the latch after a predetermined time interval.

The variable delay line 3 is manually adjustable to provide desired input-to-output delay intervals, and a mechanical turns indicator 11 associated with the delay line is utilized to visually determine the amount of delay.

Figure 2:
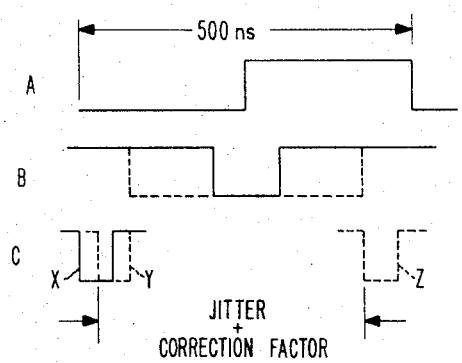
FIG. 2 shows pulse waveforms which more clearly illustrate the operation of the embodiment of FIG. 1.

The clock 1 is preferably a conventional astable multivibrator producing at its output A a train of square pulses as indicated in FIG. 2. In one embodiment of the invention, the magnetostrictive delay lines 4 are normally operated in their intended environment of use at a two megacycle data rate. Therefore, the clock 1 has a five hundred nanosecond cycle time so that it operates the magnetostrictive delay line at its intended data rate.

The pattern generator 2 can be any desired means for producing serial trains of pulses with widely varying pulse patterns. The only requirement is that the patterns vary sufficiently so as to assure a jitter condition at the output of the delay line which corresponds substantially to the maximum jitter condition which can be anticipated under actual conditions of operation.

A preferred form of pattern generator is illustrated in greater detail in the above said copending application. Briefly, the preferred pattern generator responds to clock pulses and produces at the clock pulse rate serial pulse sequences corresponding to all possible characters in a sixteen bit character set. The generator is in the form of a binary counter with sixteen bits per character, which counter is stepped one binary count for each sixteen bit cycle time. Serial readout of the counter is effected. These pulse sequences are applied to the magnetostrictive delay line under test and have been found to produce jitter conditions which are substantially similar to the maximum jitter conditions experienced in their environment of operation.

The variable delay line 3 may be any one of several types which are commercially available. Preferably, the delay line length is approximately five hundred nanoseconds, the clock cycle time, or somewhat larger. The mechanical turns indicator 11 associated with the delay line is preferably a conventional helicoidal or turns counter.

The pulse width standardizer 7 is preferably in the form of a bistable A.C. (alternating current) trigger which responds to voltage changes of one polarity at the output of the variable delay line and which includes time delayed reset means to produce an output pulse of desired polarity and of fixed time duration. Such a pulse width standardizer is described in greater detail in said copending application. As illustrated in FIG. 2, the width of the pulse produced at the output of the circuit 7 must be smaller than the difference between the clock cycle time (five hundred nanoseconds) and the total time interval of the maximum jitter condition plus the output pulse width at terminal B (e.g. two hundred-fifty nanoseconds plus one hundred nanoseconds). In the preferred embodiment, the output pulses from the circuit 7 are assumed to have a time duration in the order of fifty nanoseconds. The standardizer circuit 6 of the preferred embodiment is similar to circuit 7 except that the time duration of the output pulses is selected to be one hundred nanoseconds.

In this regard, it is noted that certain commercially available variable delay lines of the lumped constant delay type and sometimes referred to as unity gain delay lines, have associated therewith detection circuits; and the characteristics of the delay line and the detection circuitry are such that they produce a square wave output pulse of one polarity which is substantially shorter than the half cycle interval of the input frequency. Thus if such a variable delay line is utilized, it is possible to remove the circuit 7 since the delay line and its associated detection circuitry will produce the desired output pulse at terminal C.

In FIG. 2 the waveform associated with terminal B is illustrated in the form of a solid line negative-going pulse having a pulse width in the order of one hundred nanoseconds. Associated with this pulse is a broken line which illustrates the maximum amount of permissible jitter in the output of the magnetostrictive delay line 4. Assuming that the magnetostrictive delay line meets the jitter specifications which are set for it (two hundred-fifty nanoseconds), all of the pulses produced at terminal B in response to a complete sequence of pulse trains produced by the generator 2 and applied to the magnetostrictive delay line 4 will lie between the extremities of the broken line. If the magnetostrictive delay line under test does not meet the test specifications set for it, at least one or more of the pulses produced at the terminal B in response to the entire sequence of pulses will lie at least partially to the right or left of the broken line extremities.

An output pulse is produced by the logical AND circuit 5 each time there is a coincidence of the negative-going pulses at the terminals B and C. With particular attention directed to FIG. 2, it can be seen that the phase of the pulses at the terminal C can be varied from the beginning to the end of the five hundred nanoseconds cycle time illustrated.

In each position of the pulses at the terminal C, the entire sequence of pulses is applied to the magnetostrictive delay line 4 by the generator 2. If any one pulse at the terminal C is coincident with its corresponding pulse at the terminal B, the AND condition 5 will be satisfied.

Typical magnetostrictive delay lines have a manual adjustment which permits fine calibration of the delay line length. At the beginning of a jitter test, the line length is adjusted so that widely spaced single input pulses will produce delay line output pulses which occur at a predetermined position in the clock cycle, e.g. the center of the cycle as shown in FIG. 2.

The test procedure utilizing the apparatus of FIG. 1 is as follows. The variable delay line is set to its initial start position so that the output pulses at C occur at the beginning of each clock cycle. This is illustrated in FIG. 2 by phase position X of the pulses.

The pattern generator must produce all possible sixteen bit characters, i.e. sixty-five thousand, five hundred thirty-six characters, while the delay line 3 is in its start position. Each character requires sixteen clock cycles (eight microseconds) and, therefore, producing all characters requires slightly more than one-half second. If the magnetostrictive delay line length is such as to store ten thousand bits, it will take approximately five milliseconds for each pulse to traverse the delay line.

The opeartor can assume, therefore, that all possible characters will be produced and arrive at the delay line output in slightly more than one-half second. The delay line will be tested approximatey for one second for each delay setting of the variable delay line.

If within this time period there is coincidence of pulses at terminals B and C during the same clock cycle, then the AND circuit 5 will produce an output pulse to set the latch 8 and energize the indicator lamp 9. The circuit 10 will reset the latch to deenergize the lamp after a delay which is long enough for the operator to see the lamp flash on.

If during a two second period with the variable delay line in a specific adjusted position the lamp does not flash on, the operator recognizes this as an indication that none of the pulses at C and D were coincident.

The amount of delay (phase displacement) introduced into the pulses at C by delay line 3 is varied incrementally from the initial phase position X to some phase position Y in which at least one coincidence of pulses at B and C occurs for a complete sequence of characters. This position Y represents one worst case jitter condition for the delay line 4.

The amount of delay is further increased incrementally until the pulses at C occur at some phase position Z in which coincidence between the pulses at B and C no longer occurs for a complete sequence of characters. This position Z represents the other worst case jitter condition for the delay line 4.

The amount of delay (phase displacement) between the positions Y and Z is determined by readings taken from the turns indicator 11. The product of the number of turns and the delay per turn equals the total time delay from position Y to position Z. From this value a correction factor must be subtracted. The correction factor is the sum of the pulse widths of the output pulses from circuits 6 and 7. As indicated above, they are approximately one hundred nanoseconds and fifty nanoseconds respectively; but their accurate values and system errors should be accounted for. Hence, a measurement is made.

This correction factor is preferably determined only once prior to testing a group of delay lines. The test procedure described above is followed except that only single widely spaced pulses are applied by the pattern generator 2 to a delay line 4. For example, the first bit in each character of the sixteen bit character can be applied to the delay line 4. Substantially no jitter occurs at the output of the delay line 4, whereby the delay between positions Y and Z now represents only the correction factor. This correction factor is then subtracted from the jitter plus correction factor value determined during each delay line test as described above.

Figure 3:
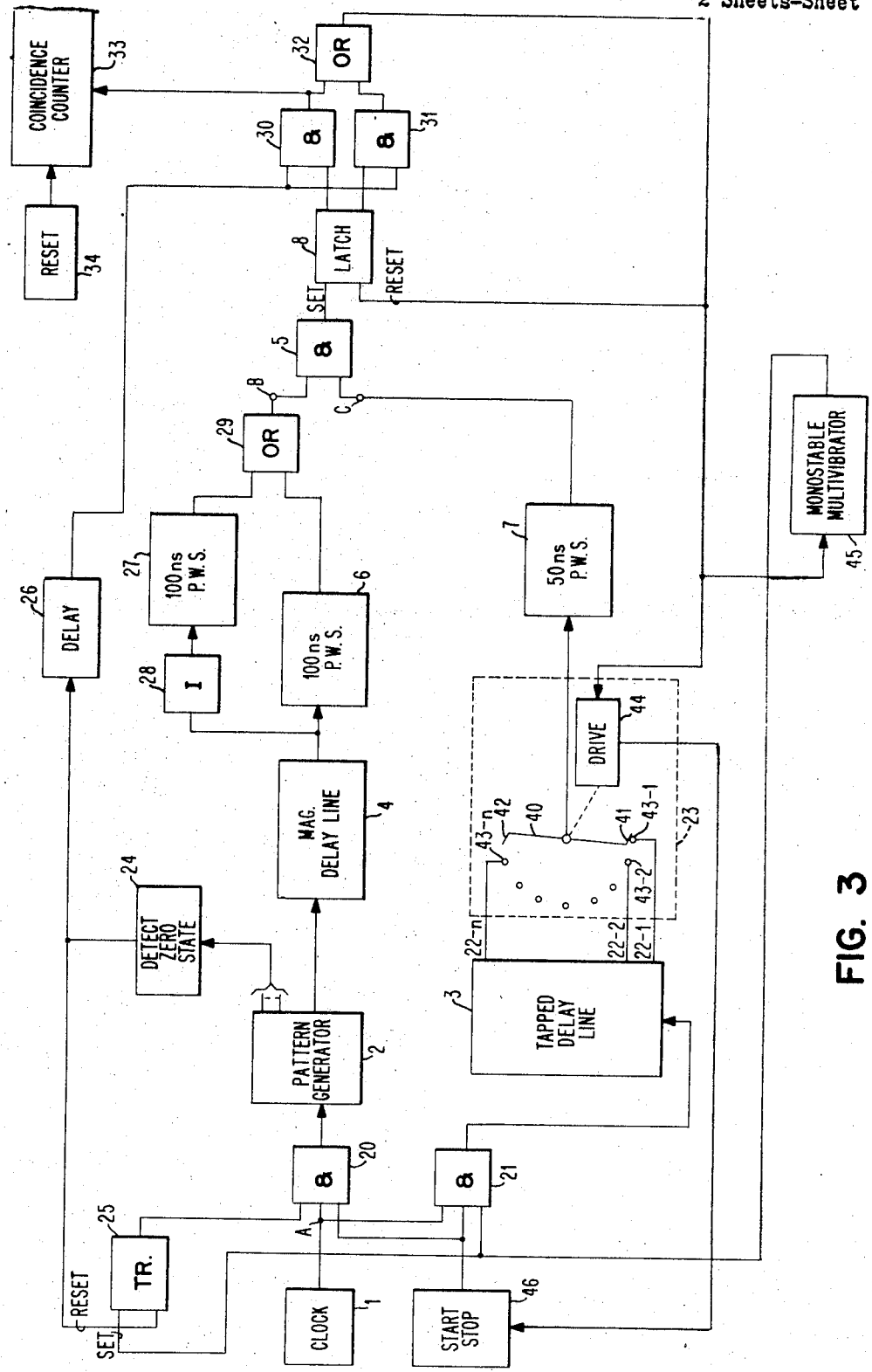
FIG. 3 illustrates diagrammatically a second embodiment of the present invention which minimizes the amount of operator involvement in the test procedure.

The apparatus of FIG. 3 conducts tests in a manner generally similar to those conducted with the apparatus of FIG. 1 except that operator involvement is reduced. Circuits in FIG. 3 which correspond to circuits in FIG. 1 are assigned the same reference numerals.

Thus the apparatus of FIG. 3 includes a clock 1 coupled to a pattern generator 2 by way of a logical AND circuit 20 and to a variable delay line 3 by way of a logical AND circuit 21. The delay line 3 is preferably in the form of a tapped delay line, with taps 22–1 to 22–n being selectively connected to a pulse width standardizer circuit 7 by a suitable switch means 23. The circuit 7 is coupled to input terminal C of a logical AND circuit 5.

The pattern generator 2 is connected to the magnetostrictive delay line 4 under test. The pulse generator is also connected to a detection 24 which produces an output pulse when the pattern generator reaches its initial state after producing an entire sequence of characters. The latter output pulse switches a bistable trigger 25, which trigger then opens the AND gate 20 to interrupt the flow of clock pulses to the generator 2.

The output pulse from the circuit 24 also samples the output of the latch 8 after a delay interval determined by the delay circuit 26. This delay interval is selected to slightly exceed the delay interval of the delay line 4 so that all characters from the generator 2 pass through the delay line 4 before the latch 8 is sampled.

The delay line 4 is connected to a pulse width standardizer 6 and to a second pulse width standardizer 27 by way of an inverter 28. As explained in greater detail in said copending application, it may sometimes be desirable to test both the positive and negative-going voltage changes at the output of the delay line 4 for jitter in NRZ (Non-Return-To-Zero) applications. In such an instance, the circuit 6 responds to a change of one polarity and the circuit 27 to a change of the opposite polarity. When only one voltage change need be checked, only the circuit 6 is required; and the circuit 27 is rendered ineffective. The inverter 28 and the circuit 27 can also be utilized in the apparatus of FIG. 1.

The circuits 6 and 27 are coupled to the input terminal B of the logical AND circuit 5 by way of a logical OR circuit 29. Coincident signals at terminals B and C cause the latch 8 to be set to one state. When the outputs of the latch are later sampled by a delayed pulse from the detection circuit 24, the latch is reset by means including logical AND circuits 30 and 31 and logical OR circuit 32.

A coincidence counter 33 is advanced one count each time that the outputs of the latch 8 are sampled subsequent to the latch being SET incident to an output pulse from the logical AND circuit 5. A manually controlled reset means 34 is provided to reset the counter 33 to a zero count condition prior to testing a delay line 4. Alternatively, the means 34 can be utilized to reset the counter to a negative count equal to the correction factor, so that its final count after testing a delay line represents the value of the maximum jitter.

The switch means 23 is shown in the form of an electromagnetically driven rotary switch having a rotatable arm 40 with wipers 41 and 42. First, one wiper is stepped to sequentially connect contacts 43–1 to 43–n to the pulse width standardizer circuit 7; then the other wiper acts to connect the contacts to the circuit 7 in sequence. A drive means 44, including a conventional magnet-driven pawl and ratchet (not shown) are provided to step the wiper arm 40. The means 44 is energized to rotate the arm 40 one step incident to sampling of the latch 8 after each complete sequence of characters.

A monostable multivibrator circuit 45 responds to each output pulse from the circuit 32 to produce an output pulse having a predetermined minimum pulse width. This pulse is of a time duration, polarity and level so as to open the logical AND gate 21, thereby preventing the application of clock pulses to the delay line 3 while switch wiper 41 and 42 being stepped from engagement with one contact to the next.

The trailing edge of the output pulse from the circuit 45 is used to set the trigger 25 back to its initial start condition which satisfies one input condition of the logical AND gate 20.

Well-known contact means (not shown) on the wiper arm shaft cause a START-STOP circuit 46 to render the AND gates 20 and 21 ineffective until a start button (not shown) is depressed to start the testing of the next delay line 4. This contact means operates when either wiper, 41 or 42, disengages the last contact 43–n and the other wiper engages the first contact 43–1.

The operation of the apparatus of FIG. 3 will now be described. Assume that a delay line 4 has been connected to the apparatus for jitter testing. The counter 33 is reset and the circuits are in their initial condition. The wiper 41 is in engagement with the contact 43–1.

The start button is now depressed to render the AND gates 20 and 21 effective to couple clock pulses to the pulse generator 2 and the delay line 3. The generator 2 produces the entire sequence of characters and applies them to the delay line 4. If there is one or more pairs of coincident pulses at terminals B and C, the latch 8 is set; if no coincidence exists, the latch remains in its reset condition.

At the end of the complete character sequence, the circircuit 24 switches the trigger 25 to open the AND gate 20, whereby the generator 2 is maintained in its initial start state. Shortly thereafter, when all characters have passed through the delay line 4, the output pulse from the circuit 24 samples the outputs of the latch 8 in AND gates 30 and 31.

The counter 33 is advanced only in the event that coincident pulses at terminals B and C had previously set the latch 8. However, irrespective of the state of the latch 8, the sampling pulse causes an output in the OR circuit 32 via AND gate 30 or 31. The output pulse from the OR circuit resets the latch if it was earlier set, and it also actuates the circuit 45 and the switch drive means 44. The drive means advances the wiper 41 into engagement with the second contact 43–2. The circuit 45 momentarily opens the gate 21; and at the end of a predetermined interval sufficient to permit the wiper 41 to be advanced, the trailing edge of the output pulse of the circuit 45 closes the gate 21 again and switches the trigger 25 to its initial state.

The apparatus is now ready to repeat the test procedure with the clock pulse delayed a longer interval by the delay line 3 via its tap 22–2.

The test procedure is similarly repeated for each tap until the wiper 42 is stepped into engagement with contact 43–1. At this time, the circuit 46 is forced to its stop condition to open gates 20 and 21. Testing of the delay line 4 is complete, and the count in the counter 33 is a measure of the maximum amount of jitter in the line 4.

What is claimed is:

1. In a method for determining whether maximum jitter conditions in the output of a magnetostrictive delay line or the like exceed predetermined device specifications, of the type in which a selected serial input pulse pattern is periodically produced, each pattern composed of pulses which are selected ones of a train of pulses having a frequency substantially equal to that at which the delay line is intended for use, in which each selected pulse pattern is applied to the delay line to produce substantially maximum jitter conditions in the resultant delay line output pulse pattern and in which the phase variations in said resultant output pulses are analyzed to determine the acceptance or rejection of the delay line,
wherein the improvement comprises the steps of producing a standardized pattern of constant width pulses substantially corresponding in number and phase to said output pulses,
producing cyclically occurring pulses at the above said frequency having a predetermined width,
selectively changing the phase of the latter cyclical pulses to succeeding different positions,
in each phase position of the cyclical pulses, applying a complete input pulse pattern to the delay line to produce a corresponding complete pattern of resultant delay line output pulses and a corresponding standardized pattern,
determining the presence or absence of coincidence of the standardized pulses and corresponding cyclical pulses in the various phase positions of the latter pulses for determining the acceptability or lack thereof of the delay line.

2. In a method for determining whether maximum jitter conditions in the output of a magnetostrictive delay line or the like exceed predetermined device specifications, of the type in which a selected serial input pulse pattern is periodically produced, each pattern composed of pulses which are selected ones of a train of pulses having a frequency substantially equal to that at which the delay line is intended for use, in which each selected pulse pattern is applied to the delay line to produce substantially maximum jitter conditions in a resultant delay line output pulse pattern and in which the phase variations in said resultant output pulses are analyzed to determine the acceptance or rejection of the delay line,
wherein the improvement comprises the steps of producing a standardized pattern of constant width pulses substantially corresponding in number and phase to said output pulses,
producing cyclically occurring pulses at the abovesaid frequency and having a constant duration pulse width according to the inequality $T4 < T3 - (T1 + T2)$, where
$T1$ = the pulse width of the delay line output pulses
$T2$ = the maximum jitter specification for the delay line
$T3$ = the period of said maximum frequency rate
$T4$ = the pulse width of the cyclical pulses;
selectivity changing the phase of the latter cyclical pulses to succeeding different positions,
in each phase position of the cyclical pulses, applying a complete input pulse pattern to the delay line to produce a corresponding complete pattern of resultant delay line output pulses and a corresponding standardized pattern,
determining the presence or absence of coincidence of the standardized pulses and corresponding cyclical pulses in the various phase positions of the latter pulses for determining the maximum phase variations in said standardized pulses.

3. The method of measuring jitter in the output signals of a magnetostrictive delay line or the like comprising the steps of:
periodically applying to the delay line a selected pattern of pulses, each pattern composed of selected ones of a train of pulses having a frequency substantially corresponding to that at which the delay line is intended for use, to produce a worst case jitter condition in the resultant train of output pulses,
producing a train of standardized pulses of predetermined time duration corresponding in number and phase to the train of delay line output pulses, producing constant time duration cyclical pulses having a frequency corresponding to the above said frequency and having a constant time duration which is a small fraction of the period of said frequency, selectively changing the phase of the cyclical pulses to succeeding different positions, in each phase position of the cyclical pulses, applying a complete input pulse pattern to the delay line to produce a corresponding complete pattern of resultant delay line output pulses and a corresponding standardized pattern, comparing the phase of the cyclical pulses in each selected phase position with the phases of the standardized pulses for the presence or absence of a coincidence condition to determine the maximum phase variation in said standardized pulses.

4. The method set forth in claim 3 further comprising the step of:

determining the sum of the time durations of a standardized pulse and a cyclical pulse for subtraction from the value of said maximum phase variation in the standardized pulses to obtain the value of the maximum jitter.

5. Apparatus for testing magnetostrictive delay lines and the like for excessive jitter comprising:

a source of clock pulses, means applying certain of the clock pulses in a selected pattern to the delay line to produce an output pulse pattern exhibiting substantially maximum jitter, means responsive to said output pulses for producing a similar pattern of standardized width pulses corresponding in phase to the output pulses, means producing additional pulses at the clock frequency rate with a time duration which is a small fraction of the clock period, means for selectively changing the phase position of said additional pulses to different positions within the clock period, means causing said first-mentioned means to produce a complete pattern of pulses for each phase position of said additional pulses, and means detecting in each phase position of the additional pulses the presence or absence of a coincidence condition of one of more standardized pulses in a complete pattern and corresponding additional pulses for determining the maximum jitter condition as a function of the number of phase positions of the additional pulses in which the coincidence condition occurs.

6. The combination set forth in claim 5, wherein the phase adjusting means includes a selectively variable delay line.

7. The combination set forth in claim 6 wherein the detection means comprises a logical AND circuit.

8. The combination set forth in claim 7 together with:

an indicator lamp, and means responsive to the detection of a coincidence condition by the AND circuit for momentarily energizing the lamp.

9. Apparatus for testing magnetostrictive delay lines and the like for excessive jitter comprising:

a source of clock pulses, means applying certain of the clock pulses in a selected pattern to the delay line to produce an output pulse pattern exhibiting substantially maximum jitter, means responsive to said output pulses for producing standardized width pulses corresponding in phase to the output pulses, means producing additional pulses at the clock frequency rate with a time duration which is a small fraction of the clock period, means for selectively adjusting the phase position of said additional pulses within the clock period, means detecting the presence or absence of a coincidence condition of one or more standardized pulses and corresponding additional pulses in each phase position of the additional pulses for determining the maximum jitter condition as a function of the number of phase positions of the additional pulses in which the coincidence condition occurs, and means for determining the number of phase positions of said additional pulses in which said coincidence condition occurs.

10. The combination set forth in claim 9 wherein the last-mentioned means comprises:

a counter which is incremented one count for each phase position of said additional pulses in which a coincidence condition occurs.

References Cited

UNITED STATES PATENTS

| | | | |
|---|---|---|---|
| 3,036,272 | 5/1962 | Le Vezu | 328—112 |
| 3,325,730 | 6/1967 | Des Brisbay. | |

RUDOLPH V. ROLINEC, Primary Examiner

P. F. WILLE, Assistant Examiner

U.S. Cl. X.R.

328—112